United States Patent
Wulff (10) Patent No.: US 10,453,318 B1
(45) Date of Patent: Oct. 22, 2019

(54) REDUCTION OF THEFT IN A VENUE BASED ON A DYNAMICALLY UPDATED HIGH-SHRINK ITEM LIBRARY

(71) Applicant: Zebra Technologies Corporation, Lincolnshire, IL (US)

(72) Inventor: Thomas E. Wulff, Brookhaven, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 5 days.

(21) Appl. No.: 15/948,128

(22) Filed: Apr. 9, 2018

(51) Int. Cl.
　　*G08B 13/24* (2006.01)
　　*G06K 7/10* (2006.01)

(52) U.S. Cl.
　　CPC ..... *G08B 13/2462* (2013.01); *G06K 7/10475* (2013.01)

(58) Field of Classification Search
　　CPC .................. G08B 13/2462; G06K 7/10475
　　See application file for complete search history.

(56) References Cited

U.S. PATENT DOCUMENTS

| | | | | |
|---|---|---|---|---|
| 8,452,868 B2 * | 5/2013 | Shafer | ............... | G08B 13/2402 709/224 |
| 2014/0362223 A1 * | 12/2014 | LaCroix | ................ | H04N 7/183 348/150 |
| 2017/0039512 A1 * | 2/2017 | Jones | ................... | G06Q 10/087 |
| 2018/0350218 A1 * | 12/2018 | Jeon | ................. | G06K 7/10475 |
| 2019/0027003 A1 * | 1/2019 | Lobo | ...................... | G06Q 10/00 |
| 2019/0080280 A1 * | 3/2019 | Tingler | ............... | G06Q 10/087 |

* cited by examiner

*Primary Examiner* — Nay Tun
(74) *Attorney, Agent, or Firm* — Yuri Astvatsaturov (57) ABSTRACT

Systems and methods are described for detecting theft events based on a dynamically updating high-shrink electronic item library. In various aspects, a server is associated with an onsite venue containing several items. The server is in communication with an electronic item library, where the server dynamically updates the electronic item library based on theft events associated with items of the onsite venue. The server further associates one or more shrink categories of the electronic item library with the items, where one of the shrink categories may be a high-shrink category. Detector station(s), located within the onsite venue, are configured to track a high-shrink item within the onsite venue, where the high-shrink item belongs to a high-shrink category of the electronic item library.

20 Claims, 5 Drawing Sheets

| | | | LIBRARY | | | | |
|---|---|---|---|---|---|---|---|
| ITEM # | DESCRIPTION | PRICE | CATEGORY | SIZE | DATE OF SHRINK EVENTS. | LOCATION OF SHRINK EVENTS. | HIGH SHRINK ITEM |
| 1 | SHOW SHOVEL | $20.00 | HARDWARE | MEDIUM | • JAN,5,2017<br>• JAN,20,2017<br>• JAN,7,2018<br>• JAN,16,2018<br>• JAN,18,2018 | STORE 1<br>STORE 5<br>STORE 1<br>STORE 1<br>STORE 5 | YES |
| 2 | SWIM SUIT | $50.00 | APPAREL | SMALL | • JUNE,1,2017<br>• AUG,3,2017 | STORE 1<br>STORE 3 | YES |
| 3 | MOBILE PHONE | $700.00 | PERSONAL ELECTRONICS | SMALL | | | NO |
| 4 | REFRIGERATOR | $3200.00 | APPLICATION | EXTRA LARGE | | | NO |
| ... | ... | ... | ... | ... | ... | ... | ... |

REDUCTION OF THEFT IN A VENUE BASED ON A DYNAMICALLY UPDATED HIGH-SHRINK ITEM LIBRARY

BACKGROUND OF THE INVENTION

Theft or "shrink" events of products or items are common at retail venue locations, and especially common at high-traffic, or routinely visited locations. Typical practices of deterring or otherwise preventing shrink events apply a holistic or universal approach, where a retail venue location, or other such establishment, will set up security measures (e.g., a security guard who checks products against receipts) that typically apply equally to all products, and without regard to the venue's location or other factors relevant to a shoplifter's current interests, the venue location's geography, or other such factors. Thus, such typical security measures may be limited, or ineffective, especially at retail venues with large quantities of products leaving the store at any given time, where it may be difficult for a holistic approach to accurately monitor all items in the venue location at once. In addition, the holistic or universal approach may fail to take into account changes in shoplifter(s)' interests with respect to changes in the weather, seasons, or other relevant factors which may affect the behavior of a shoplifter or would-be shoplifter.

Accordingly, there is a need for automatic theft-reduction systems and methods for detecting theft events based on high-shrink electronic item libraries that dynamically update based on various factors.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an embodiment, the present invention is a theft-reduction system configured to detect theft events based on a dynamically updating shrink item library. The system includes: a server associated with a venue containing a plurality of items, the server including one or more processors; an electronic item library in electronic communication with the server, the electronic item library having item-related entries for at least some of the plurality of items; a high-shrink item library in electronic communication with the server, the high-shrink item library containing high-shrink item-related entries indicative of high-shrink items that have a sufficiently high likelihood of being stolen from the venue, the high-shrink item library being dynamically updated by the server based at least on a primary theft factor and a secondary theft factor, the primary theft factor having a direct relation to at least one of the item-related entries and the secondary theft factor having an indirect relation to the at least one of the item-related entries; and a product detection subsystem disposed at least partially within the venue, the product detection subsystem configured to detect movement of the high-shrink items.

Figure 1:
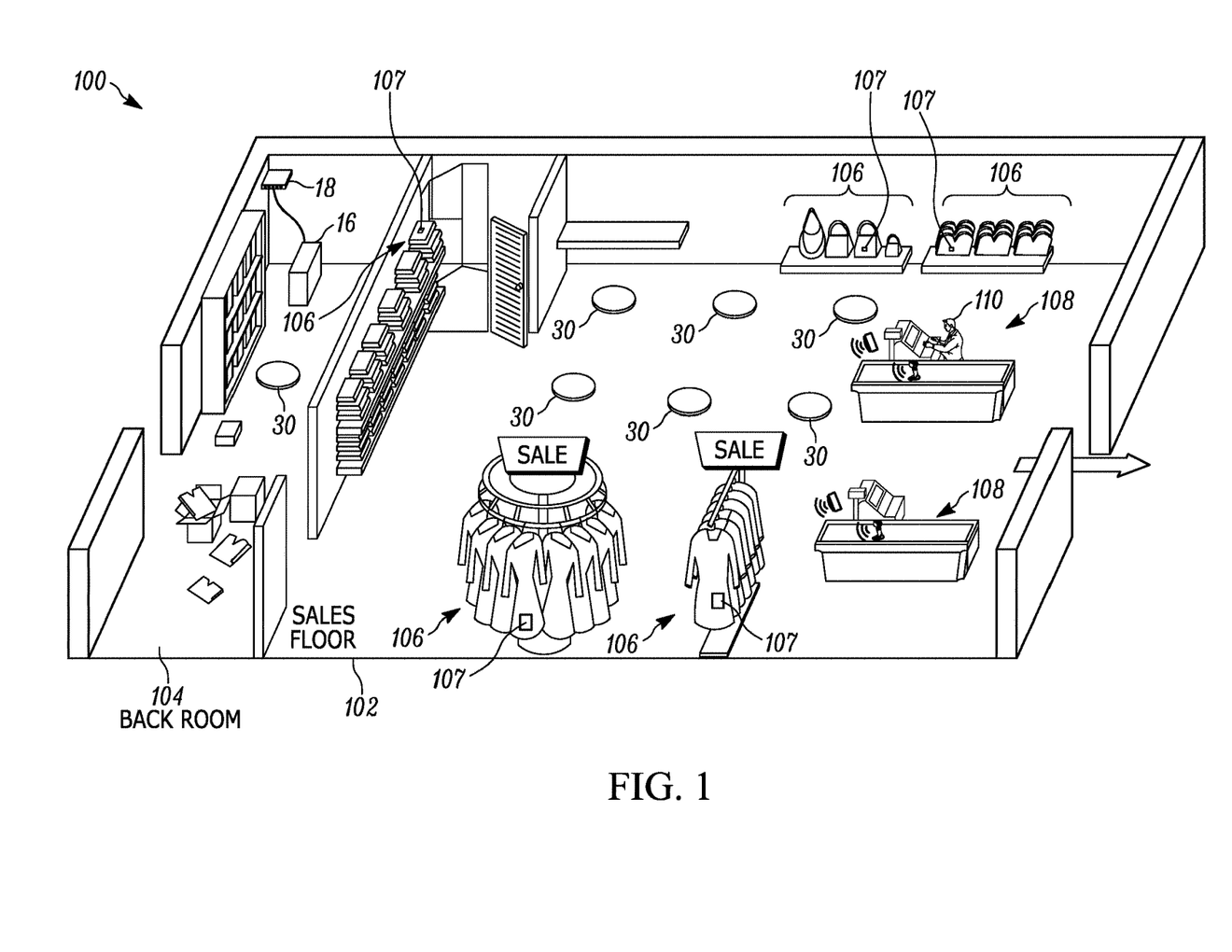
FIG. 1 illustrates an exemplary system disposed within an exemplary venue in accordance with an embodiment of the present disclosure.

Referring now to the drawings, FIG. 1 illustrates a perspective view, as seen from above, of a retail venue 100 illustrating an arrangement for detection of theft events in accordance with the present disclosure. The venue 100 includes a sales floor 102 and a back room 104. The sales floor 102 is typically accessible to the general public and is stocked with various products (also referred to as items or retail items) 106 positioned in an accessible manner to be picked and bought by the customers (also referred to as consumers). Preferably, each product 106 includes an RFID tag 107 that is associated with the respective product and is attached thereto in some manner (e.g., sticker, tag, etc.) Upon picking any number of products 106 of choice, customers typically pass through one of the POS transaction station 108 where, with the assistance of a cashier 110, they finalize their purchase of the picked products 106.

Figure 3:
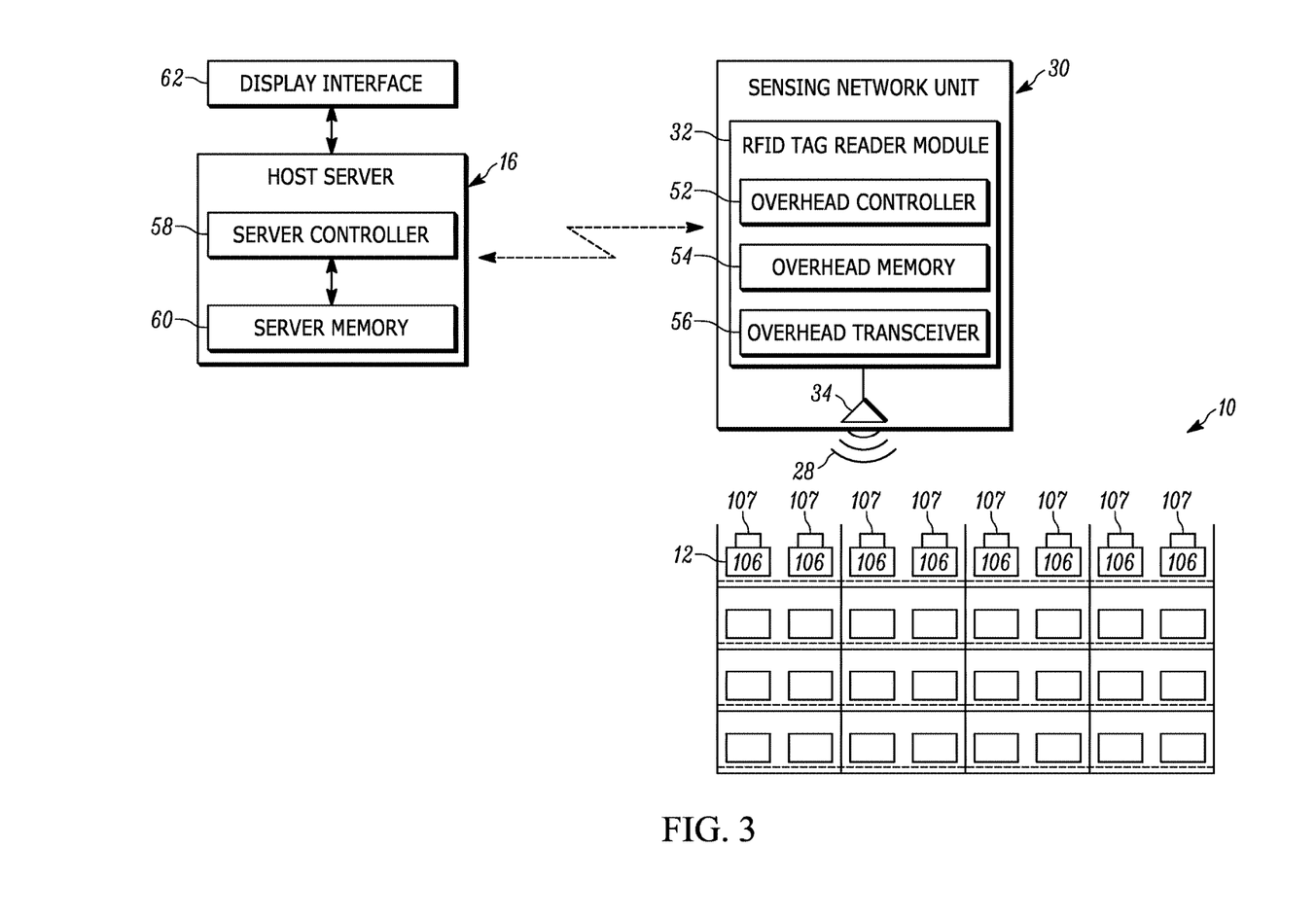
FIG. 3 illustrates a block communication diagram of some system components in accordance with an embodiment of the present disclosure.

To assist with tracking of customers and/or products and provide various metrics related thereto, a plurality of sensing network units 30 is also deployed in the venue 100. Sensing network units 30 are stationarily and fixedly mounted overhead, for example, on, or adjacent to, a ceiling. In some embodiments, the sensing network units 30 are installed every twenty to eighty feet or so in a grid pattern. A network computer or host server 16, typically locally located in a backroom 104 of the venue 10, comprises one or more computers and is in wired, wireless, direct, or networked communication with each sensing network unit 30 through a network switch 18. The server 16 may also be remotely hosted in a cloud server. The server 16 may include a wireless RF transceiver that communicates with each sensing network unit 30. For example, Wireless Fidelity (Wi-Fi) and Bluetooth® are open wireless standards for exchanging data between electronic devices. The server 16 can control each sensing network unit 30. As shown in FIG. 3, the server 16 includes a controller 58 and a memory 60, and a connected display interface 62. It should be understood that references to a server 16 providing configuration in a certain way shall also apply to the controller 58 providing configuration in the same/similar manner.

Figure 2:
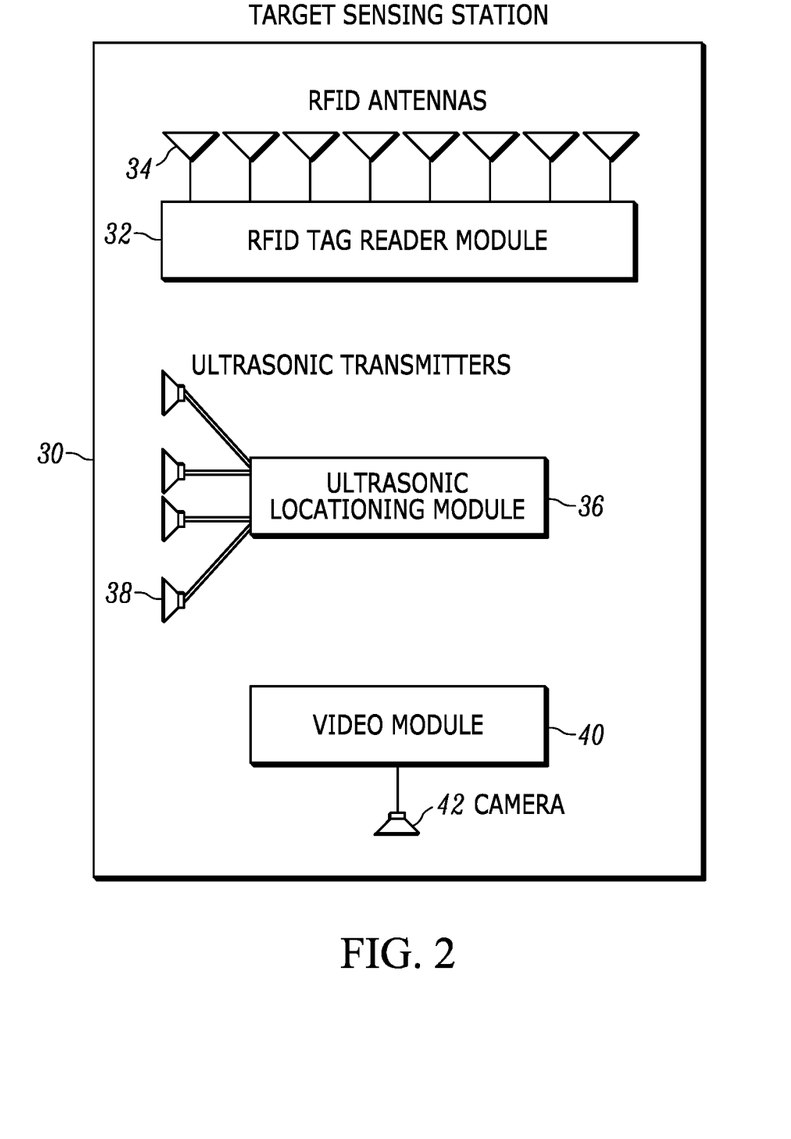
FIG. 2 illustrates a block diagram of a sensing network unit in accordance with an embodiment of the present disclosure.

The block diagram of FIG. 2 depicts various sensing systems that can be mounted in each overhead sensing network unit 30. One of these sensing systems is an RFID tag reader operative for reading the tags 107 over a corresponding plurality of coverage ranges or read-zones. More particularly, each overhead RFID reader includes an RFID tag reader module 32 that has, as shown in FIG. 3, a controller 52, a memory 54, and an RF transceiver 56, which are operatively connected to a plurality of RFID antenna elements 34, which are energized by the RFID module 32 to radiate an RF beam 28 over an antenna field pattern. The RF transceiver 56 is operated, under the control of the controller 52 and/or the controller 58, to transmit RF beams 28 to the tags 107, and to receive RF response signals from, the tags 107, thereby interrogating and processing the payloads of the tags 107 that are in its read-zone. The payload or captured target data identifies the tags 107 and their associated products.

Another of the sensing systems is an ultrasonic locationing system operative for locating an ultrasonic-capable mobile device by transmitting an ultrasonic signal to an ultrasonic receiver, e.g., a microphone, on a mobile device. A positive identification of a mobile device may be associated with a presence of a person (user). More particularly, the locationing system includes an ultrasonic locationing module 36 having control and processing electronics operatively connected to a plurality of ultrasonic transmitters, such as voice coil or piezoelectric speakers 38, for transmitting ultrasonic energy to the microphone on the mobile reader. The receipt of the ultrasonic energy at the microphone locates the mobile device. Each ultrasonic speaker 38 periodically transmits ultrasonic ranging signals, preferably in short bursts or ultrasonic pulses, which are received by the microphone on the mobile reader. The microphone determines when the ultrasonic ranging signals are received. The locationing module 36, under the control of the server 16, directs all the speakers 38 to emit the ultrasonic ranging signals such that the microphone on the mobile reader will receive minimized overlapping ranging signals from the different speakers 38. The flight time difference between the transmit time that each ranging signal is transmitted and the receive time that each ranging signal is received, together with the known speed of each ranging signal, as well as the known and fixed locations and positions of the speakers 38 on each sensing unit 30, are all used to determine the position of the microphone and of the mobile device, using a suitable locationing technique, such as triangulation, trilateration, multilateration, etc.

Another sensing system that could be used to detect a presence of a person/an object of interest is a video system operative for locating/detecting persons/objects of interest by capturing an image of a predefined field of view (FOV). More particularly, the video system can be mounted in each sensing network unit 30 and includes a video module 40 having camera control and processing electronics that is connected to a camera 42 for capturing at least one image capture (e.g., one or multiple snapshots, or a video stream). In some embodiments, the camera 42 is configured to capture an image over a FOV every x number of time units (e.g., second). In some embodiments, the camera 42 is configured to capture a continuous video stream. In some embodiments, the camera 42 is configured to capture periodic video streams every y number of time units (e.g., second) with each stream lasting every z number of time units (e.g., second). With reference to these examples, the captured images/video streams may be referred to as video capture data. The camera 42 can be a high-bandwidth, moving picture expert group (MPEG) compression camera. In some implementations, the camera may have a wide-enough FOV to capture images/video over an area that is covered by more than one RFID read-zone. In some implementations, the camera may have a FOV corresponding to a particular read-zone of a specific RFID reader. The video capture data is transmitted from the camera 42 to the server 16 for processing where image/video analysis can be employed to detect the presence of a person. In embodiments where a camera's FOV is associated with a read-zone of a particular RFID reader, the detection of a person in that camera's video capture data can signal a presence of a person in the read area of the particular RFID reader. In embodiments where a camera's FOV encompasses multiple RFID read-zones, different portions of the FOV can be associated with different RFID readers and their respective read-zones. In this case, a detection of a person in a particular portion of the FOV can signal a presence of a person in the read-zone of an RFID reader associated with the specific portion of the FOV.

Figure 4:
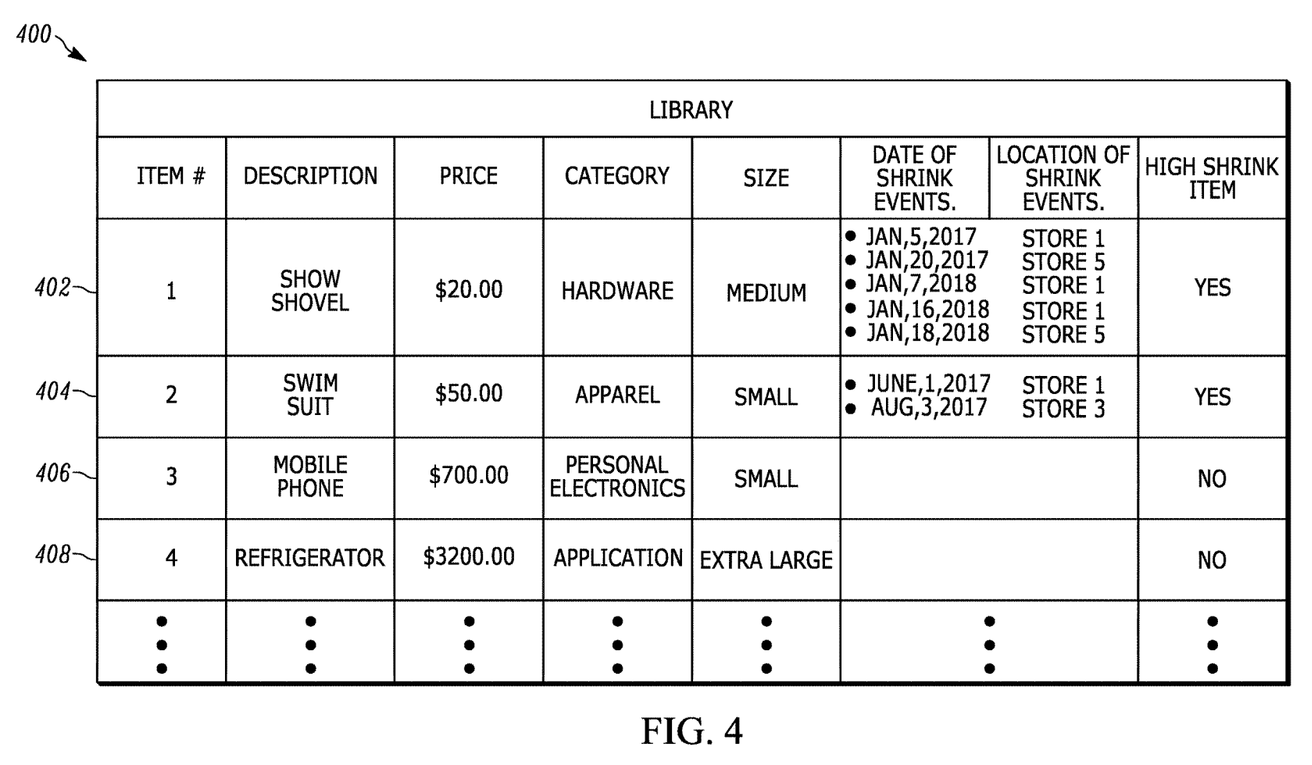
FIG. 4 is an embodiment of an example electronic item library including various shrink categories and theft events in accordance with various disclosed embodiments.

Referring now to FIG. 4, illustrated therein is an example electronic item library 400 that reflects a venue's stock of items along with each item's related entries. More specifically, the electronic item library includes a list of items 402-408 along with each item's related entries provided in each corresponding row. Item 402 (listed as Item #1) is listed as a 'snow shovel' with a price of $20.00 USD. It is classified as 'hardware' with a size of 'medium', and based on past events, there have been five shrink events associated with this item; one on Jan. 5, 2017 in Store #1, one on Jan. 20, 2017 in Store #5, one on Jan. 7, 2018 in Store #1, one on Jan. 16, 2018 in Store #5, and one on Jan. 18, 2018 in Store #1. Item 404 (listed as Item #2) is listed as a 'swim suit' with a price of $50.00 USD. It is classified as 'apparel' with a size of 'small', and based on past events, there have been two shrink events associated with this item; one on Jun. 1, 2017 in Store #1, and one on Aug. 3, 2017 in Store #3. Item 406 (listed as Item #3) is listed as a 'mobile phone' with a price of $700.00 USD. It is classified as 'personal electronics' with a size of 'small', and based on past events, there have been no recorded shrink events for this item. Finally, item 408 (listed as Item #4) is listed as a 'refrigerator' with a price of $3200.00 USD. It is classified as 'appliance' with a size of 'extra-large', and based on past events, there have been no recorded shrink events for this item.

The electronic item library 400 may be used by the theft-reduction system to populate and/or update a library of what would be considered high-shrink items. This can be done by examining primary and secondary theft factors with respect to each of the products and making a determination of whether to consider an item a high-shrink item based on these factors. Similarly, this analysis can also be carried out on an item category scale, where items falling into a common category are pooled and evaluated together. This can result in all items in a particular category being considered high-shrink items.

In some implementations, factors to be considered could be viewed as primary theft factors and secondary theft factors. The primary theft factors are those that have a direct relation to at least one of the item-related entries. In other words, one may say that primary theft factors are factors that specifically relate to a product characteristic or a product attribute. Referring to the example of FIG. 4, one exemplary factor to consider may be the item description. Those of ordinary skill in the art will recognize that certain items or certain brand-named items are known to be considered high-shrink items due to their shrink-popularity throughout an industry (e.g., retail industry). Thus, if the item description includes a particular brand name or indicates a particular item that has a known high-shrink association therewith, that could weigh in favor of labeling that item a high-shrink item. Along similar lines, other exemplary factors that may be considered may be the price of an item and the overall category that the item falls under. With respect to the price, if a price exceeds a predetermined threshold, that could again weigh in favor of labeling that item a high-shrink item. With respect to the category, similar to the item description, if an item is in some category that is associated with a higher rate of shrink events, that too could again weigh in favor of labeling that item a high-shrink item.

Other examples of primary theft factors could include aspects that more specifically link specific items with shrink events. For instance, a factor may be the history of shrink events and their dates. Taking item #1 (snow shovel) as an example, this item has had 5 shrink events over a set period of time. If that number exceeds a threshold event-occurrence value (which may be defined over a certain period of time) then this may weigh in favor of labeling that item a high-shrink item. Another example of a primary theft factor that may be considered is the size of a particular item. Small to medium sized articles can be considerably easier to shoplift than large items that can't be easily moved or hidden. For instance, while the small size of a mobile phone could be conducive to concealing the item under a patron's clothing or in a patron's bag, thus allowing it to be shoplifted with greater ease, the extra-large size of a refrigerator make it rather hard to move from some given spot without venue-employee assistance, lessening the chance of a shrink event. Thus, size classifications can be a factor taken under consideration in determining whether an item should be considered a high-shrink item. It is worth noting that while sizes in FIG. 4 have been given in general terms, those general terms can have an underlying criterion. Similarly, more precise, numerical size/weight measurements may be relied upon.

Besides considering the primary theft factors, the theft-reduction system is configured to consider secondary theft factors that have an indirect relation to the at least one of the item-related entries. These are factors that consider elements that are not directly dependent on any particular item in relation to the primary theft factors. As an example, a secondary theft factor may be the operational date (i.e., the date on which the system is conducting its monitoring). As used herein, references to a "date" are not limited to a specific calendar day, but may also refer to a period encompassed by multiple dates such as, for example, a month, season (e.g., spring as defined by a specific date range), day(s) of the week, and/or any other period of time spanning a range of days. Considering the date as a factor, if the system is conducting operations during the winter season months, it could consider the days ranging between the start of the winter season and the end of the winter season, and compare the frequency of shrink events for an item during that season. Taking item #1 (snow shovel) as an example, it is evident that all five shrink events for this item have occurred over the winter season. Thus, if the system's operation date falls within the winter season, the high frequency of winter-timed shrink events could be considered as weighing in favor of labeling that item a high-shrink item. On the other hand, if the system's operation date falls within the summer season, the low frequency of summer-timed shrink events could be considered as weighing against labeling that item a high-shrink item. Consequently, for this example, considering the primary and secondary theft factors together could lead to a determination of item #1 being labeled as a high-shrink item during the winter season and not being labeled as a high-shrink item during the summer season.

Another secondary factor could be the location of where the theft-reduction system is operating. In many instances, venue operators operate a linked enterprise resource planning type system (of which the theft-reduction system could be a part of) across multiple venue locations. As a result, library 400 may have entries for items stocked at various venue locations. Consequently, shrink event history at one venue location could differ significantly from the shrink event history of another location, weighing for or against labeling an item as a high-shrink item. For example, if the secondary factor under consideration of the location of the venue and the location where the theft-reduction system is operating is Store #1, the system may compare its operational location to the history of shrink event locations with respect to the items in library 400. Given that item #1 and item #2 have had prior instances of shrink events at that location, the high frequency of shrink events at that location could be considered as weighing in favor of labeling these items as high-shrink items. Conversely, these items have no history of theft events at Store #2. Thus, if the secondary factor under consideration is the location of the venue and the location where the theft-reduction system is operating is Store #2, the low frequency of shrink events at that location could be considered as weighing against labeling these items a high-shrink item.

Based on the above description, it should be apparent that in cases of multiple venue locations a library of high-shrink items could vary from location to location. Additionally, it should be appreciated that references to "a high-shrink item library" could include instances of a library that is separate from the item library 400 or to instances of a library that is a sub-component of the item library 400 where the a high-shrink item library is comprised of various items selected from within the library 400 and having a designation as a high-shrink item. For example, as shown in FIG. 4, each item of the library 400 may be provided with an item-related field relating to whether or not that item falls within the high-shrink item category. In an implementation, all items are listed by default as not belonging to this category with that field being changed appropriately based on the primary and secondary theft factors, as described above. Additionally, each item's 'high-shrink item' designation may be reconsidered periodically based on any desired trigger. For example, the designations may be reconsidered hourly, daily, weekly, etc. Likewise, the designations may be reconsidered upon a change in an item-related entry. For instance, if a price of an item has been adjusted, the system may be configured to reconsider whether the item should be listed as a high-shrink item. Similarly, if a shrink even has been registered in connection with some item, again, the system may reconsider the item's high-shrink item designation.

While the above embodiment lists specific factors, these are only exemplary and other factors that could have a link to an increase or decrease in shrink events are within the scope of the present disclosure. For example, the system may consider a weather forecast as a secondary theft factor, and compare the expected weather against a primary factor such as the description. Thus, in the event of extreme rain being forecasted, the system may include sump pumps (assuming sump pumps are an item in the library 400) in the high-shrink item library.

One of the advantages of the theft-reduction system, as described herein, is that the high-shrink item library can be populated/updated dynamically based on item-related entries in the primary library 400. For example, if a price threshold of $500 is implemented for the primary theft factor such that an item price of $500 of more weights in favor of labeling an item a high-shrink item, and the price is updated dynamically based on market conditions, the dynamic change in the price of the item is directly translated to the potential change in the high-shrink item library. Similarly, the dynamic change in the what is considered a high-shrink item and what isn't can be a reflection of the change of a date on which the system is operating. In other words, the contents of the high-shrink item library could change based on the system operation date. This illustrates the dynamic nature of the high-shrink item library and the advantageous flexibility of the overall theft-reduction system according to at least some embodiments of the present disclosure.

Having the dynamically updated high-shrink item library, venue operators can better track items that have a higher likelihood of being stolen and provide necessary alerts to the appropriate personnel. This can be achieved by, for example, utilizing the components and systems described in reference to FIGS. 1-3. For example, an item that is considered to be a high-shrink item can have an RFID tag (such as a tag 107) affixed thereto. The venue's tracking system can track (via the network of sensing units 30) the position of the tag and therefore the position of the high-shrink item that the tag is attached to. In the event that movement of the high-shrink item's RFID tag is detected, the system may be configured to execute any number of desired actions. These actions can include, but are not limited to, generating an alert that is forwarded to the appropriate personnel such as the venue's security personnel. The alert can take any desirable form such as an auditory tone, a graphical notification on an electronic screen, a visual beacon, and so on. Actions can also include activation of the video module and the video camera such that the camera's field of view of directed to capture image/video data from the area that the tracked RFID tag (and the corresponding product) is believed to be located in. Since the high-shrink item together with the RFID tag is likely to be moving through the venue, the video camera can be configured to pan/tilt to maintain its field of view over the area where the RFID tag is being tracked. The system can further be configured to automatically provide a video feed to the security personnel such that the personnel has a view of individual that is carrying the high-shrink item. This can allow security personnel to better track whether the high-shrink item has been taken to the cashier for checkout or whether the individual is potentially intending to shoplift the item. The tracking system can also be configured to associate an individual with a high-shrink item. This can be done by detecting an individual (via a video camera) in near (e.g., arm's length) proximity to a high-shrink item when movement of that item is detected. The system can confirm the association by continuing to track the individual when the high-shrink item is in motion. Divergence of the individual and the item would be indicative of an improper association, while a lack of divergence (generally for at least some predetermined amount of time) would be indicative of a proper association. Once an association to the individual has been made, that individual can be tracked via video tracking in the same/similar manner to the high-shrink item in that the tracking of the individual can be reported and/or recorded as desired. The tracking system's actions can additionally include recording the movement of the high-shrink items via any of the system's tracking components. For instance, the route traversed by the RFID tag, as detected by the RFID tag reader modules, can be recorded by the server. Similarly, video/image data tracking the movement of the item/individual carrying the item can also be stored on the server as needed. In some instances, keeping such tracking data indefinitely may be impractical due to bandwidth and/or memory limitations. In this case, the system may be configured to keep tracking data extending back some predetermined amount of time. Thus, in the example of retaining data for two days, tracking data that is older than two days would be discarded unless flagged for further retention. In other embodiments, tracking data may be recorded on the server in instances where a high-shrink item is tracked through the venue and a shrink event is ultimately registered in connection with that item. This way, tracking data associated with high-shrink items that are properly checked out is not retained.

It will be apparent that having tracking data associated with a shrink event can assist venue personnel with reducing the occurrence of these events. For instance, upon reviewing tracking data associated with a shrink event, it may be discovered that items are taken to a particular part of the venue where they are hidden, where security tags are removed, or where individuals take some steps to increase their chances of shoplifting an item. This finding can allow the venue operator to, for example, position additional monitoring equipment in that area or physically modify the arrangement of that area to make it less conducive to would-be shoplifters. Those of ordinary skill in the art will also recognize that the above-examples are not limiting and other combinations of alerting/tracking/recordation are within the scope of the present disclosure.

Figure 5:
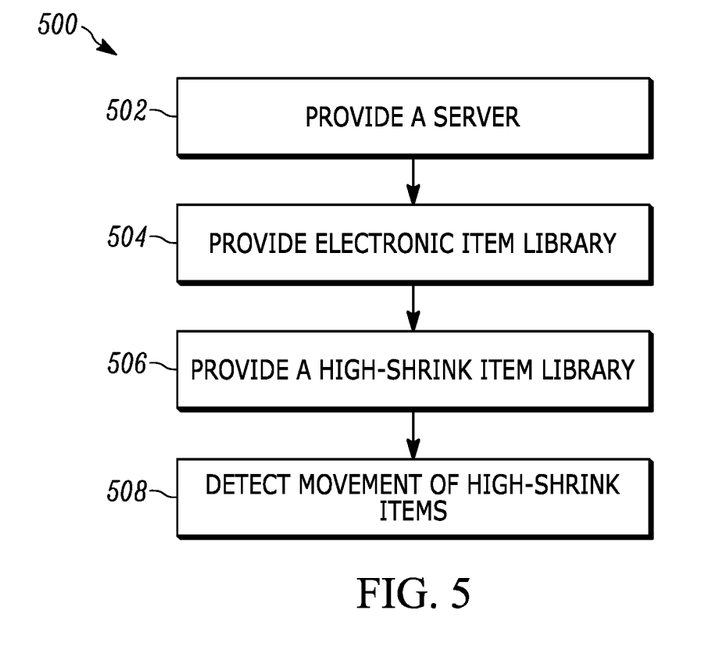
FIG. 5 is a flow chart of a method for detecting theft events based on a dynamically updating high-shrink electronic item library.

Referring now to FIG. 5, shown therein is a flowchart representative of a method 500 of identifying and tracking products having a sufficiently high likelihood of being a subject of a shrink event. In step 502, the method includes the operation of providing a server associated with a venue containing a plurality of items, where the server includes one or more processors. In step 504, the method includes providing an electronic item library in electronic communication with the server, the electronic item library having item-related entries for at least some of the plurality of items. In step 506, the method includes providing a high-shrink item library in electronic communication with the server, the high-shrink item library containing high-shrink item-related entries indicative of high-shrink items that have a sufficiently high likelihood of being stolen from the venue, the high-shrink item library being dynamically updated by the server based at least on a primary theft factor and a secondary theft factor, the primary theft factor having a direct relation to at least one of the item-related entries and the secondary theft factor having an indirect relation to the at least one of the item-related entries. Finally, in step 508, the method includes the operation of detecting movement of the high-shrink items via a product detection subsystem disposed at least partially within the venue. Those of ordinary skill in the art will appreciate that the step recited in connection with the flowchart of FIG. 5 can be carried out in accordance with the description of the systems and components recited above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A theft-reduction system configured to detect theft events based on a dynamically updating shrink item library, the system comprising:
   a server associated with a venue containing a plurality of items, the server including one or more processors;
   an electronic item library in electronic communication with the server, the electronic item library having item-related entries for at least some of the plurality of items;
   a high-shrink item library in electronic communication with the server, the high-shrink item library containing high-shrink item-related entries indicative of high-shrink items that have a sufficiently high likelihood of being stolen from the venue, the high-shrink item library being dynamically updated by the server based at least on a primary theft factor and a secondary theft factor, the primary theft factor having a direct relation to at least one of the item-related entries and the secondary theft factor having an indirect relation to the at least one of the item-related entries; and
   a product detection subsystem disposed at least partially within the venue, the product detection subsystem configured to detect movement of the high-shrink items.

2. The theft-reduction system of claim 1, wherein the item-related entries are at least one of (i) at least one item listing and (ii) at least one item category.

3. The theft-reduction system of claim 1, wherein the product detection subsystem includes a plurality of radio frequency identification (RFID) readers disposed throughout the venue, each of the plurality of RFID readers operable to read RFID tags attached to the plurality of items.

4. The theft-reduction system of claim 1, wherein the primary theft factor includes at least one of an item price, an item size, and a past item theft event.

5. The theft-reduction system of claim 1, wherein the secondary theft factor includes at least one of a date and a location of the venue.

6. The theft-reduction system of claim 1, wherein the server dynamically updates the high-shrink item library on a periodic basis using machine-learning analytics, wherein the machine-learning analytics generates the item-related entries based on the theft events of at least one of the plurality of items.

7. The theft-reduction system of claim 1, wherein the high-shrink item library is located in one or memories of the server.

8. The theft-reduction system of claim 1, wherein the product detection subsystem is further configured to generate an alert upon at least one of detecting the movement of at least one of the high-shrink items and detecting a presence of the at least one of the high-shrink items in a predefined zone of the venue.

9. The theft-reduction system of claim 1, wherein, upon an occurrence of a shrink event associated with a first high-shrink item, the server is configured to record a route associated with a detected movement of the first high-shrink item.

10. The theft-reduction system of claim 1, wherein, upon an occurrence of a shrink event associated with a first high-shrink item, the server is configured to record a route associated with a detected movement of an individual associated with the first high-shrink item.

11. A method of identifying and tracking products having a sufficiently high likelihood of being a subject of a shrink event, the method comprising:
providing a server associated with a venue containing a plurality of items, the server including one or more processors;
providing an electronic item library in electronic communication with the server, the electronic item library having item-related entries for at least some of the plurality of items;
providing a high-shrink item library in electronic communication with the server, the high-shrink item library containing high-shrink item-related entries indicative of high-shrink items that have a sufficiently high likelihood of being stolen from the venue, the high-shrink item library being dynamically updated by the server based at least on a primary theft factor and a secondary theft factor, the primary theft factor having a direct relation to at least one of the item-related entries and the secondary theft factor having an indirect relation to the at least one of the item-related entries; and
detecting movement of the high-shrink items via a product detection subsystem disposed at least partially within the venue.

12. The method of claim 11, wherein the item-related entries are at least one of (i) at least one item listing and (ii) at least one item category.

13. The method of claim 11, wherein the product detection subsystem includes a plurality of radio frequency identification (RFID) readers disposed throughout the venue, each of the plurality of RFID readers operable to read RFID tags attached to the plurality of items.

14. The method of claim 11, wherein the primary theft factor includes at least one of an item price, an item size, and a past item theft event.

15. The method of claim 11, wherein the secondary theft factor includes at least one of a date and a location of the venue.

16. The method of claim 11, wherein the server dynamically updates the high-shrink item library on a periodic basis using machine-learning analytics, wherein the machine-learning analytics generates the item-related entries based on the theft events of at least one of the plurality of items.

17. The method of claim 11, wherein the high-shrink item library is located in one or memories of the server.

18. The method of claim 11, further comprising generating an alert, via the product detection subsystem, upon at least one of detecting the movement of at least one of the high-shrink items and detecting a presence of the at least one of the high-shrink items in a predefined zone of the venue.

19. The method of claim 11, upon an occurrence of a shrink event associated with a first high-shrink item, the method further comprises recording, via the server, a route associated with a detected movement of the first high-shrink item.

20. The method of claim 11, upon an occurrence of a shrink event associated with a first high-shrink item, the method further comprises recording, via the server, a route associated with a detected movement of an individual associated with the first high-shrink item.

* * * * *